United States Patent
Martinoni et al.

(10) Patent No.: US 11,000,994 B2
(45) Date of Patent: *May 11, 2021

(54) INFILTRATED ARTICLES PREPARED BY A LASER SINTERING METHOD AND METHOD OF MANUFACTURING THE SAME

(71) Applicant: 3D Systems, Inc., Rock Hill, SC (US)

(72) Inventors: Raffaele Martinoni, Wolfhausen (CH); Paul Boehler, Uetikon (CH)

(73) Assignee: 3D Systems, Inc., Rock Hill, SC (US)

( * ) Notice: Subject to any disclaimer, the term of this patent is extended or adjusted under 35 U.S.C. 154(b) by 378 days.

This patent is subject to a terminal disclaimer.

(21) Appl. No.: 15/832,112

(22) Filed: Dec. 5, 2017

(65) Prior Publication Data

US 2018/0093415 A1  Apr. 5, 2018

Related U.S. Application Data

(63) Continuation of application No. 14/536,909, filed on Nov. 10, 2014, now Pat. No. 9,862,148, which is a continuation of application No. 11/466,154, filed on Aug. 22, 2006, now abandoned.

(60) Provisional application No. 60/710,499, filed on Aug. 23, 2005.

(51) Int. Cl.
| | | |
|---|---|---|
| B29C 64/165 | (2017.01) | |
| B29C 64/153 | (2017.01) | |
| B33Y 40/00 | (2020.01) | |
| B33Y 80/00 | (2015.01) | |

(52) U.S. Cl.
CPC .......... *B29C 64/165* (2017.08); *B29C 64/153* (2017.08); *B33Y 40/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 3,907,737 A | 9/1975 | Marx et al. | |
| 4,117,186 A | 9/1978 | O'Farrell et al. | |
| 4,147,679 A | 4/1979 | Scriven et al. | |
| 4,944,817 A | 7/1990 | Bourell et al. | |
| 4,946,717 A | 8/1990 | Magnus | |
| 5,156,696 A | 10/1992 | Kopian | |
| 5,156,697 A | 10/1992 | Bourell et al. | |
| 5,304,329 A | 4/1994 | Dickens, Jr. et al. | |
| 5,342,919 A | 8/1994 | Dickens, Jr. et al. | |

(Continued)

FOREIGN PATENT DOCUMENTS

| | | |
|---|---|---|
| DE | 19927923 A1 | 7/2000 |
| GB | 2373747 A | 10/2002 |

OTHER PUBLICATIONS

DTM (www.theautochannel.com/news/press/date/19990407/press021449.html) 1999 (in parent application).*

(Continued)

*Primary Examiner* — Joel G Horning

(57) ABSTRACT

A composition and method of infiltrating an article of manufacture prepared by a laser sintering process is disclosed. The infiltration process maintains the dimensions and flexibility of the article, increases the strength of the article, and improves the physic& and esthetic properties of the article.

20 Claims, 3 Drawing Sheets

(56) References Cited

U.S. PATENT DOCUMENTS

| | | | |
|---|---|---|---|
| 5,382,308 | A | 1/1995 | Bourell et al. |
| 5,385,780 | A | 1/1995 | Lee |
| 5,541,277 | A | 7/1996 | Muhlfeld et al. |
| 5,817,206 | A | 10/1998 | McAlea et al. |
| 6,110,411 | A | 8/2000 | Clausen et al. |
| 6,245,281 | B1 | 6/2001 | Scholten et al. |
| 6,713,125 | B1 | 3/2004 | Sherwood et al. |
| 6,814,926 | B2 | 11/2004 | Geving et al. |
| 2001/0036516 | A1 | 11/2001 | Schmidt |
| 2001/0043990 | A1 | 11/2001 | Chong et al. |
| 2003/0141633 | A1 | 7/2003 | McGlothlin et al. |
| 2004/0182202 | A1 | 9/2004 | Geving et al. |
| 2004/0226405 | A1 | 11/2004 | Geving et al. |

OTHER PUBLICATIONS

PCT International Search Report dated Feb. 19, 2007 for PCT Application No. PCT/US2006/032775 (4 pages).

\* cited by examiner

INFILTRATED ARTICLES PREPARED BY A LASER SINTERING METHOD AND METHOD OF MANUFACTURING THE SAME

CROSS REFERENCE TO RELATED APPLICATION(S)

This application is a continuation of U.S. application Ser. No. 14/536,909, filed Nov. 10, 2014, which is a continuation of U.S. application Ser. No. 11/466,154, filed Aug. 22, 2006, now abandoned, which claims the benefit of Provisional Application No. 60/710,499 filed on Aug. 23, 2005 by Martinoni, et al., and entitled "Infiltrated Articles Prepared by a Laser Sintering Method and Method of Manufacturing the Same." each of which is incorporated herein by reference in its entirety.

FIELD OF THE INVENTION

The present invention relates to a composition and method of infiltrating an article of manufacture prepared by a laser sintering process. More particularly, the present invention relates to a composition and method of infiltrating an article prepared by a laser sintering process, wherein the dimensions of the article are retained during the infiltration process, the flexibility of a flexible article is maintained, and the physical and esthetic properties of the article are improved.

BACKGROUND OF THE INVENTION

Laser sintering (LS), also termed selective laser sintering, is a process whereby a dispenser deposits a layer of powdered material into a target area. A laser control mechanism, which typically includes a computer that houses the design of a desired article, modulates and moves a laser beam to selectively sinter the powder layer within the defined boundaries of the design. The control mechanism operates the laser to selectively sinter sequential powder layers, eventually producing a completed article comprising a plurality of layers sintered together.

More particularly, laser sintering generally is performed according to the following steps:

1. A piston of a process chamber is lowered by one layer thickness, and simultaneously, a piston of a cartridge containing a particulate material is raised;
2. The particulate material is introduced into the process chamber, and a leveling roller spreads the particulate material evenly over a build surface of the process chamber;
3. The particulate material then is heated to a temperature near, but below, its softening point;
4. A laser beam then traces a predetermined cross section of an article on the layer of heated particulate material in the build surface, thus forming a solid layer; and
5. Steps 2 through 4 are repeated until manufacture of a three-dimensional article is completed.

Particulate material in areas that have not been sintered by the laser remains unfused and in place, and acts as a natural support for the article being manufactured. Accordingly, no need exists for support structures during manufacture of the article. After cooling, the article of manufacture and the unfused particulate material are removed from the process chamber, and the article of manufacture is separated from the unfused particulate material, i.e., "breakout." FIGS. 1 and 2 are schematics illustrating the LS process for the manufacture of an article having a complex shape. LS technology has enabled the direct manufacture of three-dimensional articles of high resolution and dimensional accuracy front a variety of materials including polymers and composite materials, such as polymer coated metals and ceramics.

A detailed description of LS technology can be found in U.S. Pat. Nos. 4,247,503; 4,863,538; and 5,017,753, each incorporated herein by reference. Clausen et al. U.S. Pat. No. 6,110,411, also incorporated herein by reference, provides a detailed description of the selective layer sintering process, and also discloses laser-sinterable thermoplastic compositions for use in the process.

Articles manufactured using LS technology can be rigid or flexible depending upon the identity of the particulate material used in the LS process. For example, if the particulate material contains a metal or a ceramic, the article is typically rigid. Flexible articles are prepared by an LS technique when polymeric materials such as those disclosed in WO 2005/025839 and U.S. Pat. No. 6,110,411 are used as the particulate material.

Both rigid and flexible articles manufactured by LS technology are sufficiently porous such that undesirable physical and esthetic properties can result. Porous articles having inadequate strength, unsatisfactory hardness, low abrasion resistance, and/or rough surface finish, are significantly limited with respect to the practical applications in which such articles can be used. Therefore, a method of improving the physical and esthetic properties of articles manufactured by LS technology remains a need in the art.

One means of achieving improved physical and esthetic properties is to infiltrate the article with a composition that at least partially fills the voids in the article. Infiltration is a long-practiced process to increase the strength of a porous material. However, prior infiltration methods and compositions have disadvantages, such as involving a complex procedure or altering the dimensions or physical properties of an article prepared by an LS process.

The present invention is directed to compositions and methods of infiltrating articles manufactured by an LS process that overcome the disadvantages associated with prior infiltration compositions and methods.

SUMMARY OF THE INVENTION

The present invention is directed to an improved method of infiltrating an article prepared by an LS process. For articles manufactured using an LS process, the present, method retains the flexibility of the article, maintains the dimension of the article, and improves the strength and esthetics of the article.

Accordingly, one aspect of the present invention is to provide a liquid infiltrant for infiltrating an article manufactured using an LS process. The liquid infiltrant comprises an elastomeric polymeric material, such as a natural latex, in a suitable vehicle. Preferably, the vehicle comprises water.

Another aspect of the present invention is to provide a method of infiltrating an article manufactured using an LS process comprising contacting the article with a liquid infiltrant comprising an elastomeric polymeric material. The liquid infiltrant is applied to the article one or more times to achieve the desired degree of infiltration. Drying of the article treated with the infiltrant, either air drying at room temperature or with mild heating, provides an infiltrated article of the present invention. The present infiltration method preferably does not utilize a crosslinking step.

Another aspect of the present invention is to provide an infiltrated article prepared fay an LS process comprising:

(a) applying a liquid infiltrant to the article, said liquid infiltrant comprising an elastomeric polymer, an optional colorant, and a suitable vehicle;

(b) maintaining application of the liquid infiltrant to the article for a sufficient time to allow the liquid infiltrant to penetrate the article;

(c) drying the treated article of step (b); and (d) optionally repeating steps (a) through (c) until the article is infiltrated to a desired degree or with a desired amount, of the liquid infiltrant.

In another aspect of the present invention, the liquid infiltrant and method of Infiltrating the article substantially retain the original dimensions and flexibility of the article, ifhile Increasing the strength and durability of the article. In yet another aspect of the present invention, the esthetics of the article are improved.

Still another aspect of the present invention is to provide a composition and method of infiltrating a flexible article prepared by an LS process from a particulate material comprising a block copolymer, wherein the flexibility of the article is maintained after infiltration.

Yet another aspect of the present invention is to provide an article manufactured by an LS process and subjected to an infiltration process, said article having dimensions and a resolution essentially equivalent to that possessed by the article prior to the infiltration process.

These and other novel aspects and advantages of the present invention will become more apparent from the following detailed description of the preferred embodiments taken in conjunction with the figures.

DETAILED DESCRIPTION OF THE PREFERRED EMBODIMENTS

Figure 1:
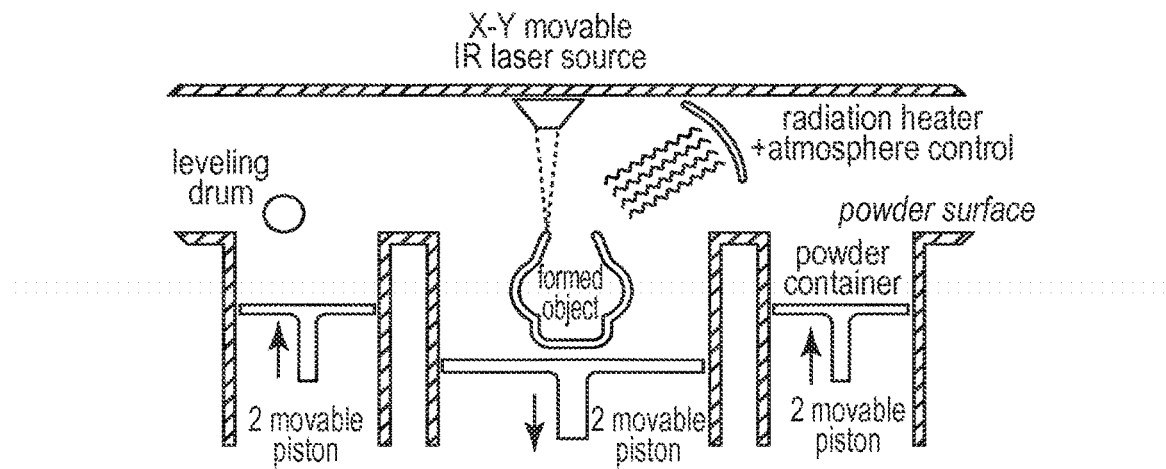
FIGS. 1 and 2 are schematics illustrating the laser sintering process.
Figure 2:
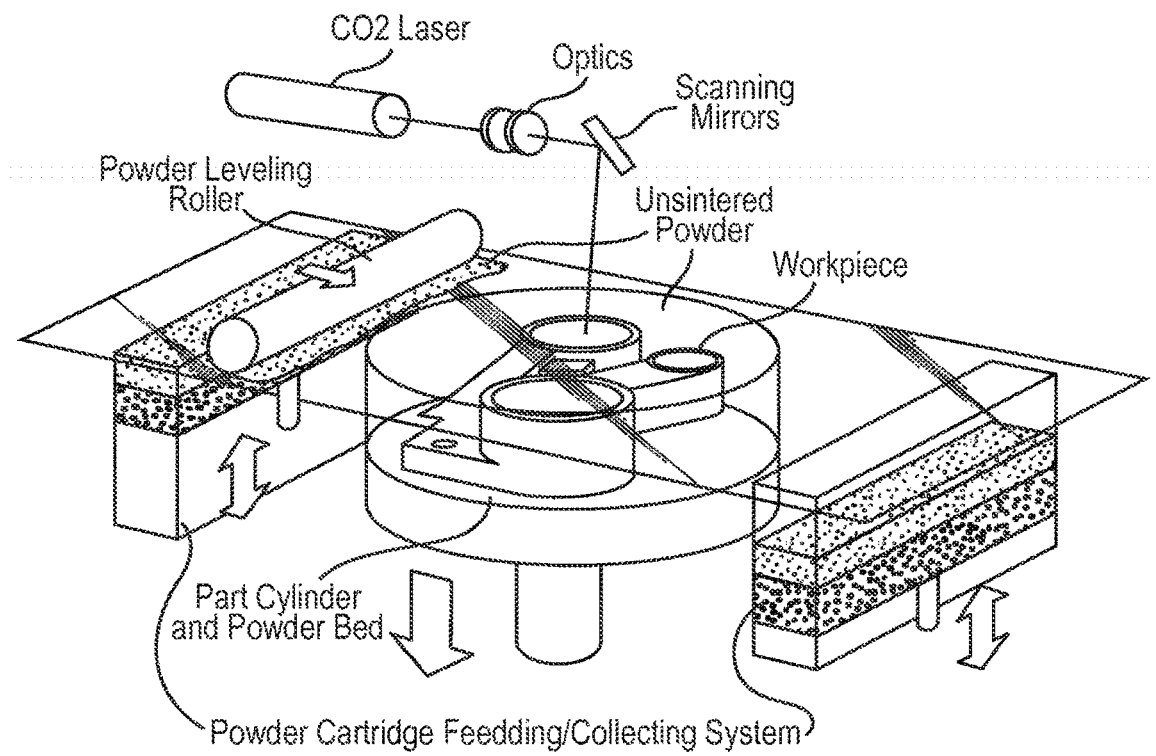

The present invention is directed to a composition and method of infiltrating an article manufactured using an LS process. The infiltration process comprises easy and low-cost steps that increase the strength and durability of the article, while maintaining the dimensions, resolution, and flexibility of the article, and improving the esthetics of the article.

An article first is built from a particulate polymeric build material using an LS process known in the art. Often, the build material is a thermoplastic polymer material that provides a flexible article. However, the present method also is useful for infiltrating rigid articles, for example, an article prepared in an LS process using a thermosetting polymeric material.

Nonlimiting examples of particulate polymeric materials useful an LS process are disclosed in WO 2005/025839 and in U.S. Pat. No. 6,110,411. The polymeric materials disclosed therein are thermoplastic block copolymers, which contain discrete segments along the polymer chain characterised as soft and hard segments. These segments are bonded one to another, randomly, by condensation polymerization such that the head of one segment is joined to the tail of another segment.

Nonlimiting examples of thermoplastic block copolymers that can be used in an LS process include, but are not limited to, copolymers sold under the tradenames HYTREL (E.I. duPont), SANFLEX (Wilden), ECDEL (Eastman Chemicals), GAFLEX (Celanese), LOMOD (General Electric), ARNITEL (Dutch State Mines), PEBAX (Arkema), ESTANE (B.F. Goodrich), ESTAMID (Dow), RITEFLEX (Ticona GmbH), PELLATHANE (Dow Chemical), Q-THANE (K.J. Quinn), and TEXIN (Mobay), HYTREL and RITEFLEX, for example, are polyether-ester elastomers; ARNITEL is a polyester-ester elastomer; PEBAX is a polyether-amide elastomer; ESTANE is a polyether-urethane elastomer; ESTAMID is a polyester-amide; and TEXIN is a polyester-urethane.

Specific block copolymers useful in an LS process include, but are not limited to, HYTREL® Types 4069, 4556, 5526, 4059FG, G4778, G4774, 555HS and 6359FG, and RITEFLEX® Type 663. Especially useful block copolymers in an LS process are HYTREL® 4068FG and RITEFLEX® 640. HYTREL® 4068FG is a thermoplastic block copolymer having a hard (i.e., crystalline) segment of polybutylene phthalue and a soft (i.e., amorphous) segment based on a long chain, polyalkylenether glycol.

The infiltration method of the present invention is not limited to a manufactured in an LS process using a flexible block copolymer. Other polymeric materials known fog use in an LS process also can be used, regardless of whether the article is flexible or inflexible. For example, a polyamide can be used as the polymeric particulate material in the LS process. Examples of useful polyamides include, but are not limited to, nylon 12 and nylon 11, sold as DURAFORM PA12, a polylaurolactam DURAFORM PA 11, EOSINT PA, and RILSAN PA-11. Other useful polyamides is elude, but are not limited to, nylon 6, nylon 66, nylon 610, nylon 612, copolymerized nylons, and mixtures thereof Another non-limiting example of a nylon that can be used is the ELV-AMIDE® line of nylon resins, available from DuPont Co., Wilmington, Del., for example, ELVAMIDE® 8061, a polyatmide terpolymer of nylon 6, nylon 66, and nylon 610.

Additional useful polymeric particulate materials are end-capped polyamides, for example, the VESTOSINT line of end-capped nylons, e.g., VESTOSINT X-1546 LV, VESTOSINT X-1546 1-HV, and VESTOSINT X4175. Additional polymeric particulate materials used to manufacture an article using LS processes include, but are not limited to, a polyethylene, a polypropylene, a polyvinyl acetate, a polymethacrylate a phenolic, an ionomer, a polyacetal, an acrylonitrile-butadiene-styrene copolymer, a polyimide, a polycarbonate, a polyurethane, copolymers of the above, and mixtures thereof.

Thermosetting resins also can be used as the polymeric particulate material. Thermosetting resins provide an inflexible article in an LS process, and include, but are not limited to, epoxies, acrylates, vinyl ethers, unsaturated polyesters, bismaleimides, and mixtures thereof. A mixture of thermoplastic resins, or thermosetting resins, or thermoplastic resin and thermosetting resin can be used as the polymer particulate material in the LS process.

Figure 3A:
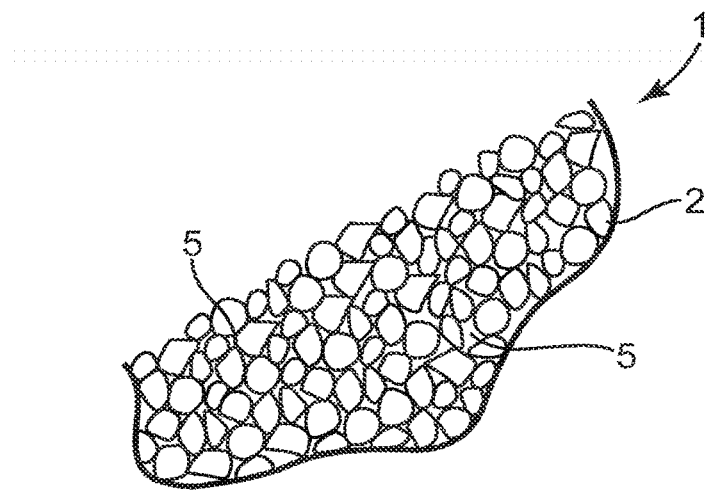
FIGS. 3a, 3b, and 3c illustrate infiltrated and uninfiltrated articles.
Figure 3B:
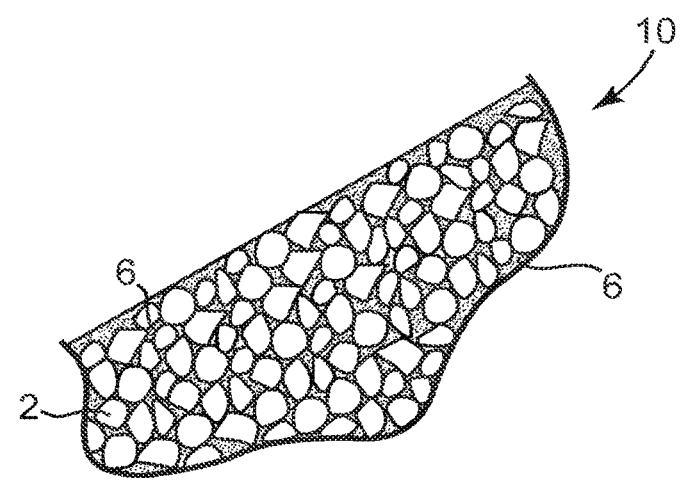
Figure 3C:
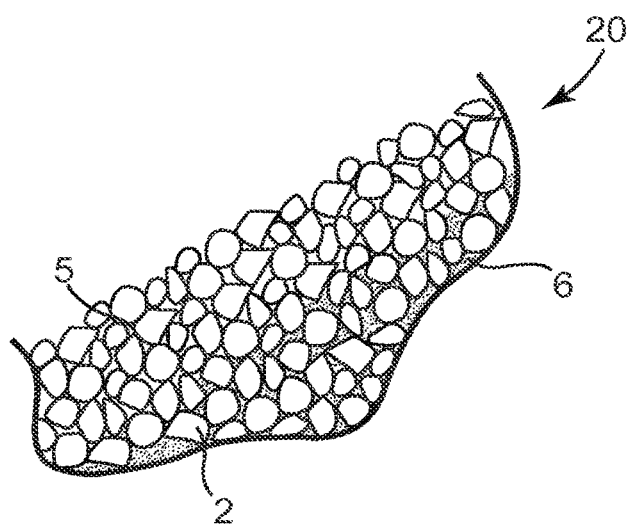

After preparation of an article by an LS process, the article is subjected to an infiltration process of the present invention. The article is infiltrated by applying a liquid infiltrant to the article, once or a plurality of times, until the article is infiltrated to a desired degree. FIG. 3a illustrates a section of an article 1 prepared by an LS process prior to infiltration. In the uninfiltrated article 1, voids 5 exist between particles of fused particulate material 2. FIG. 3b illustrates a fully infiltrated article 10 in which voids 5 of FIG. 3a are completely filled by infiltrant 6. FIG. 3c illustrates an article 20 that is partially infiltrated by infiltrant 6.

The degree of infiltration, either partial or total, is achieved by a selection of the number of times the liquid infiltrant is applied to the article, and the length of time that the liquid infiltrant is allowed to contact the article. Typically, the liquid infiltrant is applied to the article rate to four times, for about 30 seconds to 5 minutes per application. After an application of the liquid infiltrant to the article, the article can be air dried or, preferably, dried under vacuum and/or moderate heating, i.e., about 20° C. to about 40° C., to remove a substantial amount of the vehicle from the article. After the final application of the liquid infiltrant to the article, the article is dried under vacuum and/or, heating, e.g., about 30° C. to about 80° C., and most preferably about 40° C. to about 70° C. for a sufficient time to provide a tack-free article.

Maintaining the dimensions of an article prepared in an LS process is important in the design of the article. Laser sintering provides a high resolution article of accurate and precise dimensions. If subsequent process steps alter the dimensions of the article, these changes must be known and factored into the design of the LS process. Using the present infiltration process eliminates difficult design concerns because the article can be dimensioned to essentially exact specifications at the design stage without a concern of dimension and resolution changes during the infiltration step.

The liquid infiltrant applied to the article can be solvent based or aqueous based. Aqueous liquid infiltrants are preferred because such infiltrants are less prone to swelling the article to any appreciable degree. Accordingly, the dimensions and the resolution of the article remain, essentially unchanged during the infiltration process. Aqueous liquid infiltrants may optionally contain a polar organic solvent, such as an alcohol, a ketone, a glycol, a glycol ether, or a mixture thereof, to assist in dispersing or solubilizing the elastomeric material present in the liquid infiltrant.

Liquid infiltrants that are solvent based, such as hydrocarbon based, also can be used provided the solvent present in the liquid infiltrant is substantially inert with respect to the material of construction of the article, e.g., the solvent does not appreciably dissolve or swell the article.

A liquid infiltrant useful in the present method comprises an elastomeric material in a vehicle. The elastomer can be a naturally occurring resin, a synthetic resin, or a mixture thereof. In particular, one preferred elastomeric material fur use in the liquid infiltrant is a natural rubber latex, and more preferably a prevulcanized natural rubber latex. Examples of useful natural latexes include Latex FA, Latex LATZ, REVULTEX MR, REVULTEX HR, REVULTEX LA, REVULTEX LAN, REVULTEX MLA, REVULTEX HLA, REVULTEX Standard, and REVULTEX LCS, all available from Safic-Alean, Paris, France. These natural latexes contain about 60% by weight dry rubber content. Additional useful natural latexes are available under the G-TEX, GIVUL, and LOPROTEX tradenames, for example, G-TEX HA, LATZ, and MA; GIVUL LR, LAN 2056, MR, HR, LA, HM, LP2, LPT2, and LTS-LA, and LOPROTEX LPX, available from Getahindus, Malaysia and Southland Latex Co., Ltd., Thailand.

Synthetic elastomers can be used together with, or in place of, a natural latex. For example, the following synthetic elastomers can be used individually or in any compatible combination: styrene-butadiene rubber, butadiene rubber, Isoprene rubber, EP(D)M (i.e., poly(ethylene-co-propylene-co-diene), butyl rubber, nitrile rubber (e.g., acrylonitrile-butadiene or acrylonitrile-chloroprene), chloroprene rubber, a silicone, a fluorocarbon elastomer (e.g., poly(vinylidene fluoride-co-hexafluoropropene), a polysulfide rubber, a polyurethane, acrylate-butadiene rubber, ethylene-propylene rubber, styrene-isoprene rubber, vinylpyridine-butadine, vinylpyrldine-styrene-butadiene, carboxylic-acrylonitrile-butadiene, carboxylic-styrene-butadiene, chlorobutyl rubber, bromobutyl rubber, a poly(propylene oxide), a polyesterurethane, a polyetherurethane, an acrylic elastomer, an ethylene-acrylic elastomer, a chlorosulfonated polyethylene, a polyether, and mixtures thereof.

Examples of commercially available chloroprene rubbers include NEOPRENE 115, 400, 571, 622, 654, 671A, 735A, 750, and 842A (all commercially available from DuPont Elastomers as aqueous dispersions).

In sonic embodiments, the infiltrated article is suitable for contact with food or beverage products. In such embodiments, the liquid infiltrant preferably includes an elastomeric material suitable for contacting food or beverage products. Examples of preferred elastomeric materials suitable for use in such embodiments include suitable chloroprene rubbers such as, for example, suitable polychloroprene and/or copolymers of chloroprene and one or more other suitable monomers (e.g., methacrylic acic, 2,3 dichloro 1,3-butadiene etc.) NEOPRENE 571 (commercially available from DuPont Elastomers as aqueous dispersions) is a specific preferred example of a commercially available chloroprene rubber suitable for use in food or beverage applications.

The liquid infiltrant typically contains about 20% to about 60%, by weight, of the elastomeric material. The amount of elastomeric material present in the liquid infiltrant is related to the viscosity of the liquid infiltrant because if the viscosity is too high, the liquid infiltrant may not sufficiently penetrate the article. The amount of elastomeric material in the liquid-infiltrant also is related to the porosity of the article and the desired degree of infiltration.

In addition to the elastomeric material, the liquid infiltrant comprises a vehicle. As discussed above, the preferred vehicle is aqueous, and comprises a majority of water and optionally a polar organic solvent, such as an alcohol, ketone, glycol, and/or glycol ether, as process aids. Nonpolar solvents can be used as the vehicle provided the solvent does not adversely affect the article. In particular, the vehicle is selected after considering the identity of the elastomeric material in the liquid infiltrant and the material of construction of the article, such that the original dimensions of the article are changed by less than 1% and the elastomeric material effectively infiltrates the article.

In addition to the elastomeric material and the vehicle, the liquid infiltrant preferably comprises an optional antifoam additive, such as DEE FO® 215 (a slightly emulsifiable mineral oil), Ultra Additives, Inc., Bloomfield, N.J., or ADVANTAGE® 357 Defoamer (an oil-based antifoaming agent), Hercules, Inc., Wilmington, Del., and an optional flow agent, such as TEGO® Twin 4000 (a siloxane surfactant having wetting and defoaming properties), Tego Chemie Service GmbH, Essen, Germany or BYK-381 (an acrylic leveling additive for aqueous systems). BYK Chemic, Wesel, Germany, each in an amount to perform its intended function, if present at all, without adversely affecting the liquid infiltrant or the article to be infiltrated. For example, each of the optional antifoam additive and optional flow agent are present in an amount of 0% to about 0.5%, by weight, of the liquid infiltrant.

Another optional ingredient in the liquid infiltrant is a colorant. An article manufactured by an LS process typically has an opaque appearance because of the presence of minute air bubbles in the article. After infiltration using the present method, the article has a transparent appearance because the voids of the article have been infiltrated. By including a colorant in the liquid infiltrant, the liquid infiltrant imparts a glossy color to the article.

The colorant can be any dye or pigment, organic or inorganic in nature, that is soluble or dispersible in the liquid infiltrant. The colorant optionally can be iridescent, fluorescent, phosphorescent, or conductive. The colorant can be, for example, a color such as cyan, magenta, yellow, black, and mixtures thereof to produce any desired color. The colorant also can be white in color.

The colorant can be from dye classes such as Color Index (C.I.) dyes, solvent dyes, disperse dyes, modified acid and direct dyes, and basic dyes. Polymeric colorants also can be used, such as Blue 92, ink Red 357, Ink Yellow 1800, and Ink Black 8915-67. Other yellow, cyan, magenta, and black polymeric colorants can be used alone or in combination with conventional colorants such as those disclosed in U.S. Pat. No. 5,372,852. Solvent soluble dyes also can be used.

The colorant also can impart conductive properties on the object, such as by using a metal oxide dye. In addition, if desired, the colorant can be phosphorescent, thereby emitting light following exposure to incident radiation if desired.

The colorant is present, if at all, in a sufficient amount to impart the desired color degree and color intensity to the infiltrated article without adversely affecting the article or the liquid infiltrant as a whole. The colorant typically is added to the liquid infiltrant as a paste or dispersion of the pigment in an aqueous or nonaqueous solvent in an amount of about 0.1% to about 15%, as active colorant, by weight of the composition.

The following is a nonlimiting example of a liquid infiltrant utilized in the present method.

Example 1

| | Weight % |
|---|---|
| Elastomeric material[1] | 80 |
| Antifoam[2] | 0.8 |
| Flow agent[3] | 0.2 |
| Colorant[4] | 8 |
| Water | 11 |

[1]REVULTEX ® MR, 60 wt % active, available from Revertex (Malaysla) SDN, BND., Johor, Malaysia;
[2]DEE Fo 215, 100 wt % active, available from Ultra Additives;
[3]TEGO TWIN 4000, 100 wt % active, available from Tego Chemie;
[4]Pintasol Black E-WL8 (C.I. Number 77266), 57 wt % active, available from Clariant, Leeds, UK.

The composition of Example 1 was prepared by mixing the ingredients under constant mixing speed under constant mixing. After admixing the composition ingredients, the composition was filtered to remove any particulate or gelled material.

An article prepared by an LS is infiltrated by applying a present liquid infiltrant to the article by dipping, brushing, or spraying. The liquid infiltrant can be applied to the article once or a plurality of times, and typically is applied two to four times. The infiltrated article is allowed to dry after each application at about 20° C., to about 30° C. After the final application, the infiltrated article is dried at a temperature of about 30° C. to about 80 ° C., and more preferably about 50° C. to about 70° C., for a sufficient time to provide, a tack-free article to the touch. The specific mode of application, time of application, and drying time is related to the composition of the infiltrant and to the structural complexity, thickness, and material of construction of the article.

After infiltration of the article, the article has a smooth, rubber-like feel, regardless of whether the article is flexible or inflexible. Flexible articles retain their flexibility, and the elasticity of the elastomeric method of the infiltrant on the article surface precludes the formation of crack on the surface.

Importantly, the infiltrated article essentially retains the dimensions and resolution of the uninfiltrated article, i.e., swelling of the article due to the infiltration process is less than 1% of article volume. The present infiltration process also permits coloring of the article with essentially any colorant that can be solubilized or dispersed in the liquid infiltrant.

In addition to imparting improved esthetics to the article, the present infiltration method renders the article substantially nonporous, e.g., waterproof and airproof, and improves the mechanical properties of the article, such as an improved tear strength and elongation at break. The following table illustrates the tear strength, elongation at break, and Shore A hardness for a flexible article prepared in an LS system using a block copolymer, i.e., a polybutylene phthalate-long chain polyalkylurethane glycol block copolymer, as the polymeric build material, prior to and after infiltration using the liquid infiltrant of Example 1. In the infiltration process, the article was dipped into the liquid infiltrant of Example 1 two times for a time period of 30 seconds each, followed by drying after each dipping at 60° C. for 45 minutes in an oven.

The infiltrated article was fully infiltrated. The tear strength test was performed using ASTM Method D 638.

| Laser (W) | Wt of Infiltrant | Infiltrant | % Infiltrant of the Infiltrant Part |
|---|---|---|---|
| 15 | 1.3 g | Example 1 | 16.67% |
| 13 | 1.4 g | Example 1 | 18.67% |
| 11 | 1.6 g | Example 1 | 21.92% |
| 9 | 1.6 g | Example 1 | 22.22% |
| 7 | 2.2 g | Example 1 | 30.99% |
| 5 | 2.3 g | Example 1 | 33.82% |

| | Elongation | | | | | | |
|---|---|---|---|---|---|---|---|
| | Uninfiltrated | | | Infiltrated with Example 1 | | | |
| Laser (W) | Part Weight (g) | Shore | Elongation (%) | Weight (g) (Part Infiltrant) | Shore | Elongation (%) | Elongation Delta (%) | Shore Delta (%) |

-continued

| 15 | 6.5 | 76 | 306 | 7.8 | 78 | 314 | 2.61 | 2.63 |
|----|-----|----|----|----|----|----|------|------|
| 13 | 6.1 | 72 | 256 | 7.5 | 77 | 292 | 14.06 | 6.94 |
| 11 | 5.7 | 66 | 230 | 7.3 | 74 | 262 | 13.91 | 12.12 |
| 9  | 5.6 | 64 | 196 | 7.2 | 69 | 238 | 21.43 | 7.81 |
| 7  | 4.9 | 60 | 176 | 7.1 | 66 | 194 | 10.23 | 10.00 |
| 5  | 4.5 | 44 | 136 | 6.8 | 55 | 158 | 16.18 | 25.00 |

Tear Strength

| Laser (W) | Uninfiltrated | | | Infiltrated | | |
|---|---|---|---|---|---|---|
| | mm² | N/mm² | N | mm² | N/mm² | N |
| 15 | 40.00 | 4.46 | 178 | 40.65 | 4.42 | 180 |
| 13 | 40.15 | 3.59 | 144 | 40.17 | 3.85 | 155 |
| 11 | 39.08 | 3.03 | 118 | 39.74 | 3.17 | 126 |
| 9  | 40.15 | 2.27 | 91  | 40.45 | 2.45 | 99  |
| 7  | 39.75 | 1.72 | 68  | 39.89 | 1.88 | 75  |
| 5  | 39.00 | 1.09 | 43  | 39.24 | 1.32 | 52  |

In the above table, as the laser power increases (i.e., as W increases), the article manufactured by an LS process has a lower porosity, and consequently is a harder article (i.e., the Shore hardness increases). Therefore, less liquid infiltrant is necessary to infiltrate an article preparing using 15 W (i.e., 16.67% of the infiltrated article is infiltrant) compared to an article prepared using 5 W (i.e., 33.82% infiltrant).

The table also shows that infiltrating a porous article (e.g., using a low wattage) substantially increases the mechanical properties of the article. i.e., a substantially increased Shore hardness, elongation at break, and tear strength. Articles manufactured in an LS process using a high wattage also show an increase in mechanical properties, but the percent improvement is less because less infiltrant is required to infiltrate the harder article.

The table further shows that the amount of infiltrate of a fully infiltrated article varies with the laser power used in the LS process. The amount of infiltrate of a full infiltrated article also varies with the identity of the article. In general, a fully infiltrated article, after drying, contains up to about 50% of the infiltrant, by total weight, of the infiltrated article. Preferably, the fully infiltrated article, after drying, contains about 10% to about 40%, and more preferably about 15% to about 35%, of the infiltrant, based on the total weight of the infiltrated article.

What is claimed is:

1. A method of infiltrating a flexible article prepared by a laser sintering method, the method comprising:
   (a) applying a liquid infiltrant to the article for a sufficient time to allow the liquid infiltrant to infiltrate the article, said liquid infiltrant comprising:
      (i) an elastomeric material comprising a naturally occurring resin, a synthetic resin, or a mixture thereof;
      (ii) a vehicle comprising a majority of water; and
      (iii) an optional colorant;
   (b) drying the infiltrated article; and
   (c) optionally, repeating (a) and (b) until the article is infiltrated to a desired degree,
   wherein the infiltrated article is flexible.

2. The method of claim 1, wherein the infiltrated article is formed from a particulate thermoplastic polymer.

3. The method of claim 1, wherein dimensions of the article after infiltration differ from the original dimensions by less than 1%.

4. The method of claim 1, wherein the method does not include crosslinking.

5. The method of claim 1, wherein the flexibility of the article after infiltration is essentially identical to the flexibility of the article prior to infiltration.

6. The method of claim 1, wherein the elastomeric material is present in the liquid infiltrant in an amount of 20% to 60% by weight of the liquid infiltrant.

7. The method of claim 1, wherein the elastomeric material comprises a naturally occurring resin and the naturally occurring resin comprises a natural rubber latex.

8. The method of claim 7, wherein the natural rubber latex is prevulcanized.

9. The method of claim 1, wherein the elastomeric material comprises a synthetic resin and the synthetic resin comprises styrene-butadiene rubber, butadiene rubber, isoprene rubber, poly(ethylene-co-propylene-co-diene) rubber, butyl rubber, nitrile rubber, acrylonitrilebutadiene rubber, acrylonitrile-chloroprene rubber, chloroprene rubber, a silicone, a fluorocarbon elastomer, poly(vinylidene fluoride-co-hexafluoropropene), a polysulfide rubber, a polyurethane, acrylate-butadiene rubber, ethylene-propylene rubber, styrene-isoprene rubber, vinylpyridine-butadine, vinylpyridine-styrene-butadiene, carboxylic-acrylonitrile-butadiene, carboxylic-styrenebutadiene, chlorobutyl rubber, bromobutyl rubber, a poly(propylene oxide), a polyesterurethane, a polyetherurethane, an acrylic elastomer, an ethylene-acrylic elastomer, a chlorosulfonated polyethylene, a polyether, or a mixture thereof.

10. The method of claim 1, wherein the vehicle further comprises a polar organic solvent.

11. The method of claim 10, wherein the polar organic solvent comprises an alcohol, a ketone, a glycol, a glycol ether, or a mixture thereof.

12. The method of claim 1, wherein the infiltrant comprises a colorant and the colorant is present in the liquid infiltrant in an amount of 0.1% to 15%, by weight.

13. The method of claim 1, wherein the infiltrated article is dried at a temperature of 20° C. to 80° C.

14. The method of claim 1, wherein the infiltrated article is dried by applying a vacuum.

15. The method of claim 1, wherein the liquid infiltrant is applied to the article by dipping the article into the liquid infiltrant or by spraying the liquid infiltrant onto the article.

16. An infiltrated article prepared by the method of claim 1.

17. The infiltrated article of claim 16, wherein the article is substantially nonporous.

18. The infiltrated article of claim 16, wherein the article exhibits improved tear strength and elongation at break compared to the article prior to infiltration.

19. The infiltrated article of claim 16, wherein the article is infiltrated through the total volume of the article.

20. The infiltrated article of claim 16, wherein less than the total volume of the article is infiltrated.

* * * * *